No. 609,752. Patented Aug. 23, 1898.
J. T. N. ANGELL.
METALLIC PACKING.
(Application filed Aug. 12, 1897.)
(No Model.) 2 Sheets—Sheet 1.
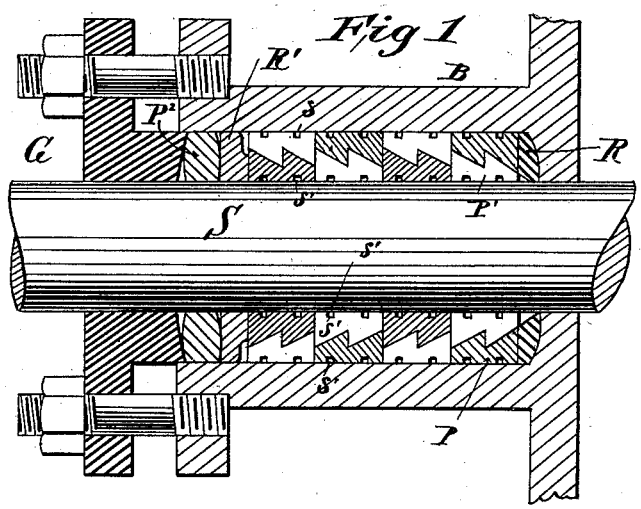
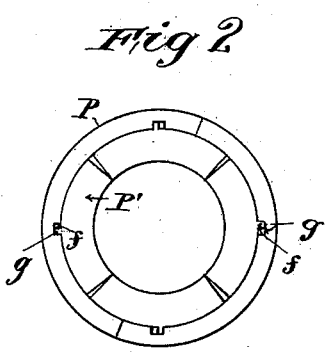
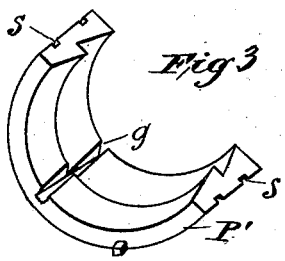
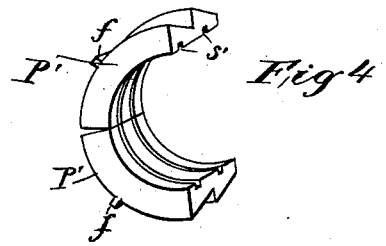
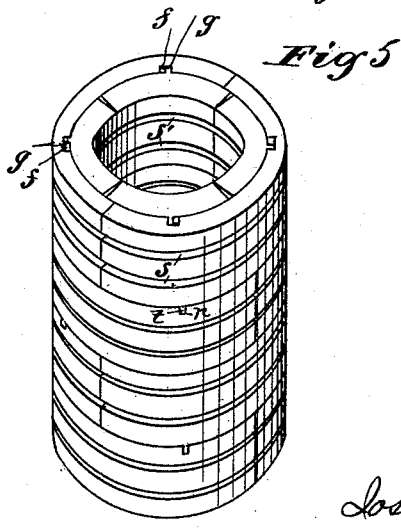
Attest:
C. W. Benjamin
Peter P. Vermilya
Inventor:
Joseph T. N. Angell
By K. G. Vermilya
his atty No. 609,752. Patented Aug. 23, 1898.
J. T. N. ANGELL.
METALLIC PACKING.
(Application filed Aug. 12, 1897.)

(No Model.) 2 Sheets—Sheet 2.

Attest
C. W. Benjamin
P. W. R. Vermilya

Inventor,
Joseph T. N. Angell
By A. G. N. Vermilya
his atty

UNITED STATES PATENT OFFICE.

JOSEPH THOMAS NAYLOR ANGELL, OF NEW YORK, N. Y.

METALLIC PACKING.

SPECIFICATION forming part of Letters Patent No. 609,752, dated August 23, 1898.

Application filed August 12, 1897. Serial No. 648,087. (No model.)

*To all whom it may concern:*

Be it known that I, JOSEPH THOMAS NAYLOR ANGELL, a citizen of the United States of America, and a resident of New York, in the county and State of New York, have invented certain new and useful Improvements in Metallic Packing, of which the following is a specification, reference being had to the accompanying drawings, forming part of the same, in which—

Figure 6:
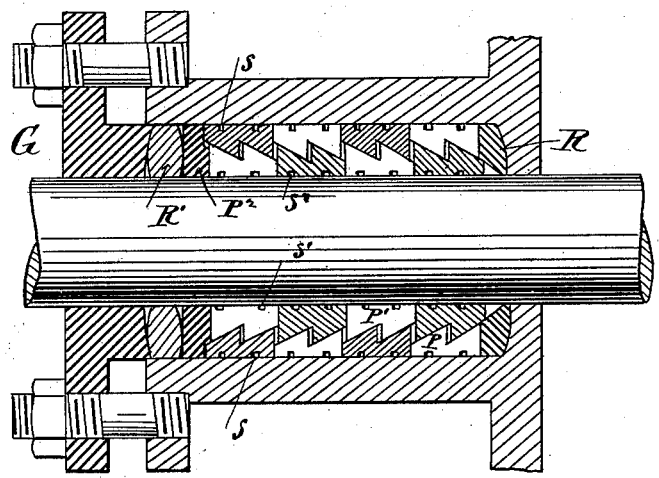
Figure 7:
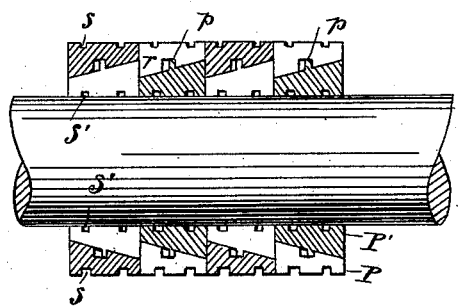
Figure 8:
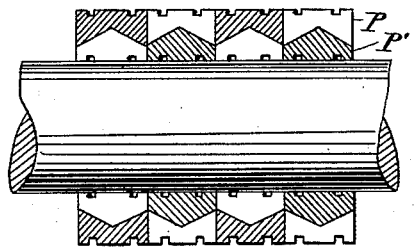

Figure 1 is a side elevation of a shaft and a central vertical longitudinal sectional view of a stuffing-box and gland and a series of packing-rings embodying one form of my invention. Fig. 2 is an upper face view of one pair of the rings of said packing, the interior one shown in four sections and the outer one in two. Fig. 3 is a perspective view of a portion of one of said outer rings. Fig. 4 is a similar view of a portion of one of said inner rings. Fig. 5 is a perspective view of four pairs of such rings in a stack. Fig. 6 is a view similar to Fig. 1, but representing the rings in the positions which they occupy when some wear has reduced the inner faces of the inner rings and they have consequently shifted their positions. Fig. 7 is a view similar to Fig. 1 of a shaft and a set of rings of modified form, and Fig. 8 is a similar view of another modification.

My invention relates to metallic packing for use in the stuffing-boxes of shafts, rods, and analogous parts of machinery.

It consists, essentially, in two rings having the features claimed, one arranged within the other, their adjacent curved faces being formed at an angle to their other curved faces. They, in fact, constitute two circular wedges, with a conical surface at one face only of each and with the conical surface of one in contact with the conical surface of the other, but oppositely set.

S is any shaft which is to be packed.

B is the stuffing-box, and G its gland. In the bottom of the box I preferably place a ring R, made in two sections, its outer diameter being equal to that of the interior diameter of the box and its interior diameter to that of the shaft. This ring is used to fill the rounded bottom of the box and make a perfectly flat base or seat for the rings. In some instances it is entirely omitted. Its inner edge on the flat side is preferably cut away to permit the inward movement of the inner rings of the pairs constituting the packing.

My packing-rings are preferably constructed in sections, that they may be put in place without requiring to be passed over the end of the shaft. The outer ring P has its convex surface similar to that of a plain cylinder of such a diameter as to closely fit within the wall of the stuffing-box within which it is to be used, but its inner face concave and cut at an angle to the outer surface, which may be that shown or more or less inclined, as may be desired, care being taken that it shall not be so great as to require a great movement to take up slight wear of the inner ring (which it does, as will be described) nor so slight as to require too great pressure to cause the desired movement of said inner ring. This inner face in section may be bounded by a single straight line, as is shown in Fig. 7, it may have a double inclination, as shown in Fig. 8, or it may (as I prefer to have it) be formed of two lines inclined from the outer face, united by a single line, preferably at right angles to said face, as shown in Figs. 1 and 6. Besides the inner and outer faces it preferably has upper and lower faces at right angles to the line bounding the outer face in order to form on one ring a bearing for the next, several being generally used together. It may have on or in its inner face a groove $g$ or a recess $r$ and on its outer face one or more, usually two, niches or slots $s$, extending entirely about its periphery, and when a series of rings are used I prefer to make on the bottom a projection $t$ and on the top a niche $n$ to fit it, that their adjustment one to the other may be maintained. It is preferably made of brass. The inner ring P' is the complement of the outer ring. Its inner face is convex and in section is bounded by a straight line and provided with one or more slots $s'$. Its upper and lower faces are preferably planes and at right angles to the line bounding its inner face in section. Its outer face is arranged to substantially fit the inner face of the outer ring, being inclined to its own inner face at the same angle (when reversely considered) that the inclined face of the outer ring has to its outer face. If the outer ring has a groove or recess, the inner one will be provided with a feather $f$ or pin $p$ to receive it; but said feather or pin will not fit the slot or recess tightly, as that would prevent the adjustment, to be hereinafter described. The inclination of the wedge-like faces as they extend toward the bottom of the box is preferably toward the interior of the ring, except in the form shown in Fig. 8, and even then the acting faces are thus inclined, the others being for the time inactive. This interior ring I prefer to construct of Babbitt or analogous metal and in three or four sections (I have shown four) and to cut away slightly the adjacent faces of the several sections, as shown in Fig. 2. Having arranged a series of these compound rings in the box, I preferably put above them a metal ring R', made in two sections, its lower face of a diameter less than that of the upper face of the outer ring, that it may not bear thereon, and above it a ring of soft packing $P^2$, and then screw down the gland until all parts bear properly. The inclined faces might be arranged to constitute a screw-thread instead of in the forms shown; but I am satisfied that of Fig. 1 is to be preferred.

The operation is manifest. As the interior rings are worn away by friction the gland may be turned down farther, thus forcing said inner rings farther down in the stuffing-box; but as they are thus forced down the action of their inclined faces against the inclined faces of the outer rings (which, as shown, are fixed and cannot move) crowds the inner rings more tightly upon the shaft and the outer rings more tightly against the wall of the box. The adjacent edges or ends of the sections of the inner rings being beveled, as described, the sections can move inward until they impinge upon the shaft, and thus it is kept tightly packed, and though there will be a separation between the adjacent upper and lower faces of the different rings of the series, as shown in Fig. 6, that separation will be of only a portion of the theretofore bearing-faces, and will not leave an opening entirely through from one side to the other of any one ring, and will not therefore be objectionable.

I have said that the outer rings, as shown, cannot move, and I prefer to so arrange them; but it is plain that the crowding could be accomplished by holding the inner rings from longitudinal movement on the shaft and moving the outer ones farther into the stuffing-box; but in such event the inclination of the wedge-like faces of the two rings would need to be reversed.

As the rings are in section, it is of course desirable to break joints not only as between the outer ring and the inner one of one pair, but also between one pair of rings and the next pair of the series. This may be easily done in placing the packing in position; but to maintain the parts with joints properly broken I have provided the feather or pin on one portion and the slot or groove or recess on the other of one pair and the projection on one face of one and the niche in the face of the next of the series of rings, which effectually insures that the original arrangement shall be maintained, though provision must be made for permitting the movement of one ring of the pair upon the other. This may readily be done by forming the groove or recess somewhat larger than the feather or pin.

The beveling of the ends of the sections of the inner ring is on such an angle that as the parts wear away the inner faces of the sections of the ring where the ends touch will just closely encircle the shaft without leaving open spaces between. The required angle may be readily calculated upon knowing the size of the shaft and the number of sections. I prefer the form of ring shown in Figs. 1 and 6 for this reason. In placing the packing the gland may be run back, the sections of packing may be placed one after the other upon the shaft, and all being arranged in proper order a slight cord or a piece of spring-wire will hold them together until they are forced into the stuffing-box and secured, the locking of one part in the other effectually preventing any portion from escaping when they have once been placed about the shaft; but if the form of Fig. 7 were used, without pins, though the parts were properly placed and secured, as described, there would be nothing to prevent the sections of the last interior ring from falling out if the mouth of the box were downward, and thereby occasioning trouble before the whole slack could be pushed into the stuffing-box and secured.

The circumferential grooves in the outer rings and the corresponding interior grooves in the inner ring gradually accumulate and hold a ring of water, which, once collected, acts as a water seal against the passage of steam between the packing and the wall of the box on the one side and the shaft and the packing on the other.

The great advantage of this packing, however, is that at all times each compound ring has a bearing upon the shaft and upon the box, and the work is not performed by one piece which bears at one side and several others bearing upon the other side, thereby unequally distributing the work and rendering the packing less durable and less effective.

What I claim, and desire to secure by Letters Patent, is—

1. A metallic packing composed of a series of outer sectional rings placed one upon another, their outer faces being adapted to fit a stuffing-box, their upper and lower faces being substantially flat and their inner faces provided with one or more conical faces together with a series of sectional inner rings, whose faces on the inside are adapted to fit the rod to be packed and on the outside are adapted to fit the inner faces of the outer rings and whose upper and lower faces are substantially flat, substantially as specified.

2. A metallic packing composed of a series of inner and outer sectional rings having faces with double conical surfaces substantially as described upon the inner sides of the outer rings and the outer sides of the inner rings, the outer face of the outer rings being adapted to fit the stuffing-box, the inner face of the inner rings to fit the rod to be packed and the lower faces of which are adapted and arranged to fit upon and be supported by the adjacent upper faces of the succeeding ring of like character, all substantially as set forth.

3. A compound sectional metallic packing-ring composed of an outer and an inner ring, the outer face of the first and the inner face of the second being adapted to fit respectively, the stuffing-box and the rod to be packed and the faces of which said rings opposite those named have double conical surfaces, whereby when pressure is put upon one ring it may slide down over the conical part of the other and yet in setting there is a holding together of the parts, substantially as set forth.

In testimony that I claim the foregoing as my invention I have signed my name, in presence of two witnesses, this 28th day of July, 1897.

JOSEPH THOMAS NAYLOR ANGELL.

Witnesses:
RANDALL WHITAKER,
WM. H. VAN WART.